United States Patent [19]

Shimomura

[11] Patent Number: 5,021,629
[45] Date of Patent: Jun. 4, 1991

[54] ELECTRIC PLASMA ARC POWDER WELDED SLIDE LAYER FOR ROTARY FLUID PUMP VANE

[75] Inventor: Soichi Shimomura, Yono, Japan

[73] Assignee: Nippon Piston Ring Co., Ltd., Tokyo, Japan

[21] Appl. No.: 330,525

[22] Filed: Mar. 30, 1989

[30] Foreign Application Priority Data

Apr. 8, 1988 [JP] Japan .................................. 63-47935

[51] Int. Cl.⁵ ............................................... B23K 9/00
[52] U.S. Cl. ........................... 219/121.59; 219/121.47; 219/76.16; 427/34; 418/178
[58] Field of Search .................. 418/179, 178; 427/34, 427/423, 375; 219/121.36, 121.47, 121.59, 121.48, 74, 75, 76.16, 76.15

[56] References Cited

U.S. PATENT DOCUMENTS

| | | | |
|---|---|---|---|
| 4,212,602 | 7/1980 | Buran et al. | 418/179 |
| 4,376,793 | 3/1983 | Jackson | 219/121.47 |
| 4,739,146 | 4/1988 | Lindland et al. | 219/121.47 |

FOREIGN PATENT DOCUMENTS

| | | | |
|---|---|---|---|
| 0071578 | 6/1981 | Japan | 219/76.16 |
| 0023282 | 2/1985 | Japan | . |
| 0017363 | 1/1986 | Japan | 219/76.16 |
| 0197781 | 9/1986 | Japan | . |
| 0166074 | 7/1987 | Japan | . |
| 3248572 | 10/1988 | Japan | 219/76.16 |
| 3250447 | 10/1988 | Japan | 219/76.16 |

*Primary Examiner*—M. H. Paschall
*Attorney, Agent, or Firm*—Sughrue, Mion, Zinn, Macpeak & Seas

[57] ABSTRACT

A vane for a rotary fluid pump and a method for producing the vane are disclosed. The vane has a base vane body and an overlaid welding layer which functions as a sliding layer. The sliding layer is formed by using alloy powders and applying plasma arc to the end face of the base vane body. The alloy powders have high wear resistivity high resistance to thermal seizure and high corrosion resistance. During application of the plasma arc, the alloy powders are supplied, so that first and second layers are presented in the sliding layer. The first layer which is an inner layer is formed of a mixture of a material of the base vane body and the material of the alloy powders, and the second layer which is an outer layer is formed of the alloy powder material only.

3 Claims, 3 Drawing Sheets

ELECTRIC PLASMA ARC POWDER WELDED SLIDE LAYER FOR ROTARY FLUID PUMP VANE

BACKGROUND OF THE INVENTION

The present invention relates to a vane for rotary fluid pump, and more particularly, to a type thereof in which an alloy layer having high wear resistivity, high resistance to thermal seizure, and high corrosion resistance is provided at a sliding surface of the vane by overlaid or build up welding. The present invention also relates to a method for producing the vane.

A rotary fluid pump is used in an air conditioner. One conventional rotary fluid pump is shown in FIG. 1, in which a cylindrical housing 21 is formed with a vane groove 21A extending in radial direction thereof, and a roller 22 is eccentrically rotatably provided within the housing 21. A shaft 23 is integrally fixed to the roller 22 for its rotation, and a vane 1' is slidably disposed in the vane groove 21A. The vane 1' is normally biased toward the roller 22, so that a radially inner end face or a nose portion of the vane 1' is in sliding contact with an outer peripheral surface of the roller 22. Such structure is well known in the art.

The conventional vane 1' is formed of cast iron or steel such as SKH 51 defined by JIS, Japanese Industrial Standard, which is a high speed tool steel containing 0.8–0.9% of C, 3.8–4.5% of Cr, 4.5–5.5% of Mo, 5.5–6.7% of W, 1.6–2.2% of V, and balance Fe. Further, a vane formed of aluminum or carbon is also used for the purpose of reduction in weight. In the vanes, generally, high wear resistance is required particularly at the nose portion which is in sliding contact with the roller. Therefore, there has been proposed a composite vane in which high grade material is provided at the nose portion, and a low grade material is used at the remaining portion of the vane. Such composite vane is provided by spraying or sintering method for providing the nose portion, and is also advantageous in production cost.

However, in case of the cast iron vane or steel vane, sufficient wear resistance may not be obtainable so as to withstand high friction attendant to high speed rotation of the roller which high speed is required for increasing pump output. Further, the carbon vane has inherent deficiencies such as high production cost, difficulty in machining, and insufficient wear resistivity. Furthermore, regarding the composite vane, the sprayed or sintered layer may be peeled off from the vane body due to insufficient bonding strength, and, sufficient material yieldability is not obtainable.

Japanese Utility Model Application Kokai No. 60-23282 and Japanese Patent Application Kokai No. 61-197781 disclose a composite vane whose nose portion is provided by fusing alloy powders by means of a heat source providing high density energy. That is, the alloy powders are accumulatingly mounted on an end face of the vane, and thereafter, the high heat energy is applied to the end face so as to melt the alloy powder in an attempt to obtain the vane sliding portion having high hardness. However, according to this method, alloy powders on the end face of the vane may be scattered when the heat source is applied thereto. As a result, yieldability may be lowered, and uniform dimension of the resultant sliding portion may not be obtainable, and further, various production steps are required.

SUMMARY OF THE INVENTION

It is therefore, an object of the present invention to overcome the above-described drawbacks, and to provide an improved vane for a rotary fluid pump.

Another object of the invention is to provide such vane whose sliding portion has high wear resistance, high resistance to thermal seizure, and high corrosion resistance.

Still another object of the invention is to provide such vane capable of being produced at low cost with sufficient yieldability.

Still another object of the invention is to provide an improved method for producing such vane.

These and other objects of the invention will be attained by providing a vane for a rotary fluid pump including a roller and a roller housing, comprising: a base vane body formed of a ferrous material and having one end face; and, a sliding layer integrally formed over the end face and in sliding contact with the roller. The sliding layer comprises an overlaid welding layer formed of alloy powders having wear resistance, thermal seizure resistance and corrosion resistance. The overlaid welding layer is formed by a plasma powder welding(PPW) and comprises a metal fused layer integrally formed over the end face, and a pure alloy layer formed over the metal fused layer. The metal fused layer contains the ferrous material of the base vane body and the alloy powder material, and the pure alloy layer only contains the alloy powder material.

Further, in the present invention there is provided a method for producing a vane for a rotary fluid pump comprising the steps of: preparing a vane base body formed of ferrous material, the base vane body having an end face; preparing alloy powders for forming a sliding layer over the end face; generating a plasma arc directed toward the end face while simultaneously feeding the alloy powders toward the plasma arc for providing a molten metal pond over the end face; and, moving the base vane body and scanning the plasma arc while continuously feeding the alloy powders for successively depositing the molten metal over the entire surface of the base vane body.

With this arrangement, the alloy powders having high wear resistance, high thermal seizure resistance and high corrosion resistance are used as the material of the sliding layer, and the sliding layer comprises an internal metal mixture layer in which a material from the base vane body and a material of the alloy powders are fuse bonded together by the application of the plasma arc. Therefore, high bonding strength is obtainable between the sliding layer and the base vane body. Further, the sliding layer also comprises an outer pure alloy layer in which the alloy powder materials are fuse bonded together by the application of the plasma arc. Therefore, the outermost surface of the sliding layer can exhibit desirable wear resistivity, thermal resistivity and corrosion resistance, those being inherent characteristics of the alloy powders.

DETAILED DESCRIPTION OF THE PREFERRED EMBODIMENTS

A vane according to one embodiment of this invention will be described with reference to FIGS. 2 thru 5.

Figure 3:
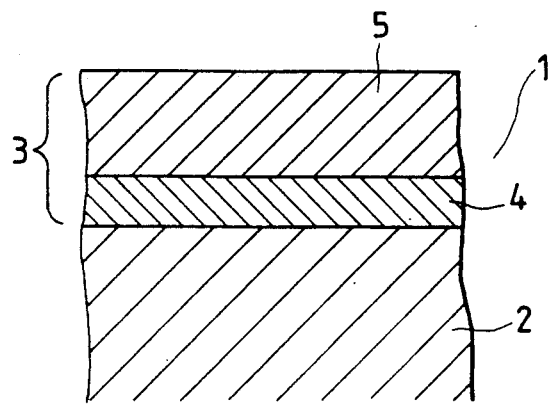
FIG. 3 is a cross-sectional view showing a part of a vane according to this invention.
Figure 4:
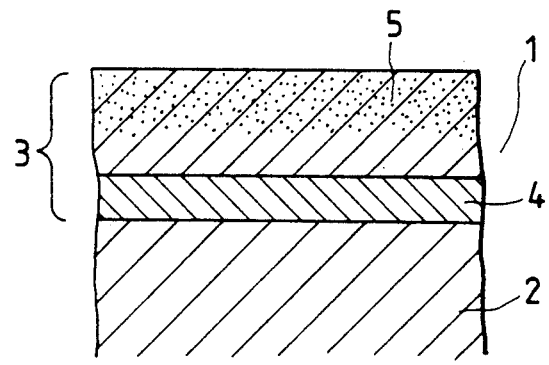
FIG. 4 is a cross-sectional view showing a part of a vane in which nitriding treatment is effected to the vane shown in FIG. 3.

As shown in FIGS. 3 and 4, a vane 1 has a base body 2 formed of cast iron or steel and an alloy layer (overlaid welding layer) 3 formed on an end face of the base body 2.

In the present invention, alloy powers are prepared, which have high wear resistivity, high resistance to thermal seizure and high corrosion resistance. Composite carbide alloy, cobalt-base alloy and ferrous alloy can be used as a material of the alloy powders. Scanned plasma arc is applied to the end face of the base body 2 while supplying the alloy powders onto the end face for conducting the overlaid welding, so that the alloy overlaid welding layer 3 is provided at the nose portion of the vane 1.

Figure 2:
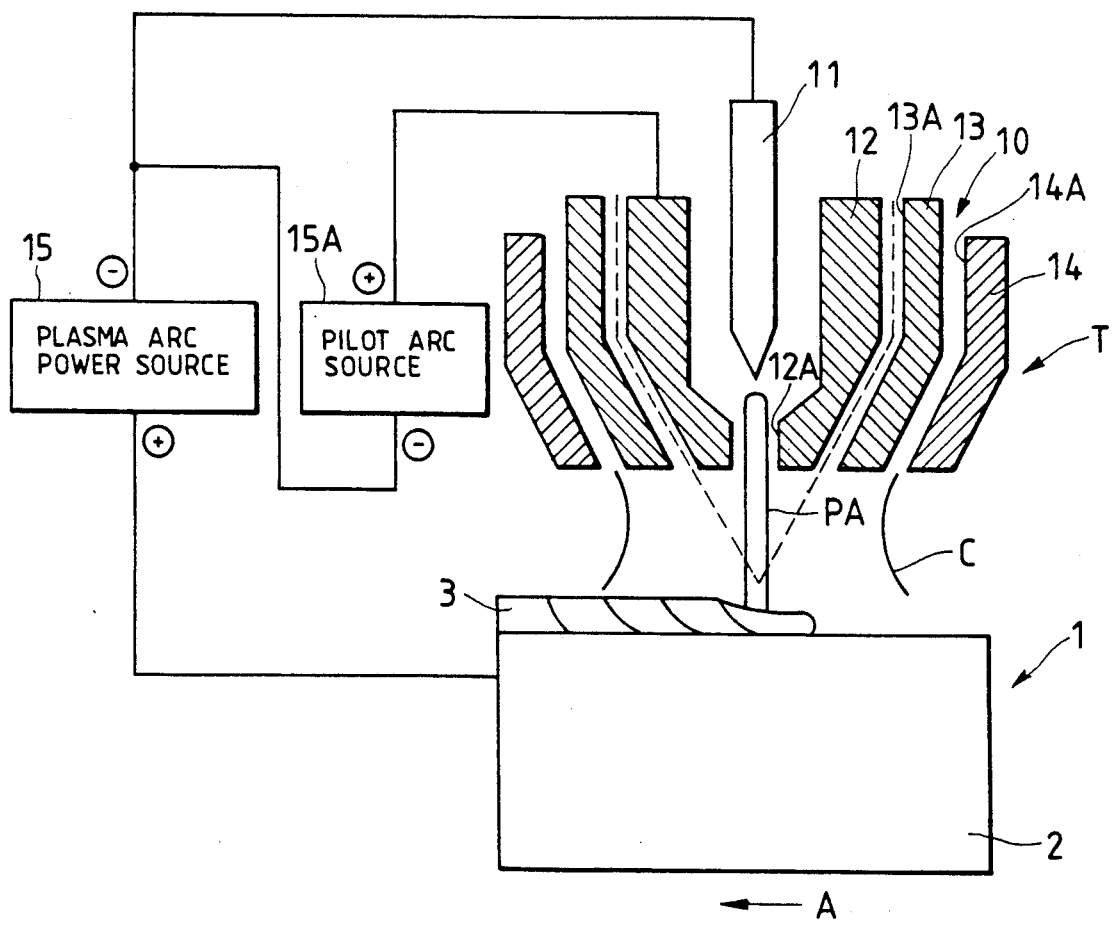
FIG. 2 is a schematic illustration for description of a method for producing a vane according to the present inveniton.

FIG. 2 shows a plasma arc welding apparatus 10 for making the alloy overlaid welding layer 3. The apparatus 10 includes a welding torch T disposed oscillatable. In the torch T, a non-consumptive tungsten electrode 11 is centrally disposed, and a plasma arc converging nozzle 12 is disposed around the electrode 11. The nozzle 12 defines therein a plasma arc passage 12A for concentrating plasma arc onto a specific portion of the end face of the base body 2. Further, in the torch T, an alloy powder supply nozzle 13 is concentrically disposed over the nozzle 12, and a shield gas nozzle 14 is concentrically disposed over the nozzle 13. More specifically, a cylindrical passage 13A is defined between the plasma arc converging nozzle 12 and the alloy powder supply nozzle 13 for allowing the alloy powders and an inert gas such as argon to pass therethrough. The lower end portion of the passage 13A is conically formed, so that the alloy powders are directed toward the plasma arc PA in cooperation with the feeding of the inert gas through the passage 13A. Furthermore, between the alloy powder supply nozzle 13 and the shield gas nozzle 14, another cylindrical passage 14A is defined for flowing an inert gas such as argon gas therethrough.

The tungsten electrode 11 is connected to a plasma arc power source 15 providing a direct current, and the base body 2 is also connected to the power source 15. A pilot arc source 15A is provided which is connected between the plasma arc converging nozzle 12 and the power source 15.

The plasma arc PA is fired between the electrode 11 and the end face of the base body 2 within the inert gas atmosphere since the inert gas passes through the passage 13A. At the same time, the alloy powders are supplied from a hopper (not shown) through the passage 13A and are directed to the plasma arc PA by the inert gas passing through the passage 13A as shown by a broken line in FIG. 2. When the alloy powders are in contact with the plasma arc PA, the alloy powders are melted. The thus melted alloy powders are accumulated on the end face of the base body 2, so that a molten metal pond is provided on the end face which is also protected or shielded by an inert gas curtain C provided by flowing the gas through the passage 14A.

Figure 5:
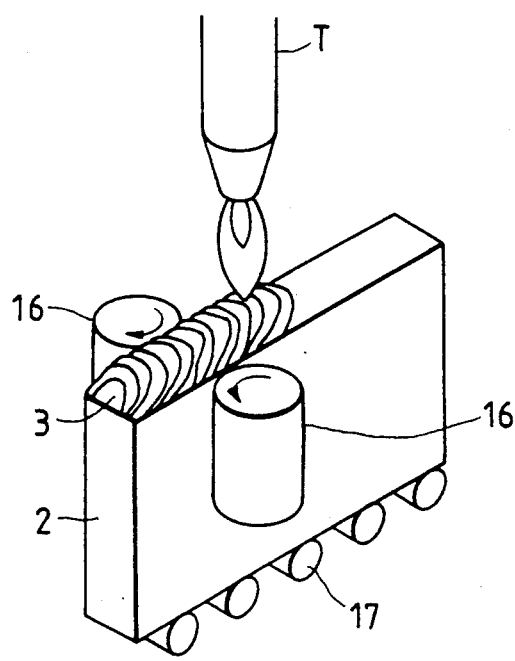
FIG. 5 is a schematic perspective view showing a method for forming an overlaid welding layer at a nose portion of the vane according to the present invention.

As shown in FIG. 5, the base body 2 is movable in a lengthwise direction as indicated by an arrow A in FIG. 2, while the plasma torch T is ocsillatable in a thickness direction of the base body 2, i.e., in the direction perpendicular to the travelling direction of the base body 2. As a result, a welding bead is formed over the end face of the base body 2 to thereby provide the overlaid welding layer 3.

FIG. 5 particularly shows a method for forming the overlaid welding layer 3 over the base body 2. The plate like base body 2 is interposed between a pair of rotatable cylindrical jigs 16 and 16. The jigs 16 are normally cooled, so that the base body 2 is cooled in order to avoid melting of the entire body 2 by the rotational contact with the jigs 16. Further, the lower end face of the base body plate 2 is in contact with a plurality of rollers 17. Above the upper end face of the base body 2, the welding torch T is disposed. By rotating the jigs 16 about their axes, the base body 2 is moved in a longitudinal direction over the rollers 17. During this movement, the torch T is oscillatingly moved in thickness direction of the base body 2 for successively providing the overlaid welding layer 3.

As best shown in FIG. 3, the overlaid welding layer 3 includes a metal fused layer 4 formed immediately over the base body 2, and the alloy powder layer 5 formed over the metal fused layer 4. The metal fused layer 4 contains a mixture of the alloy powder material and the material of the base body 2, whereas the alloy powder layer 5 only contains the material of the alloy powders. That is, in the metal fused layer 4, the metal of the base body 2 is melted and entered into the molten alloy formed over the end face of the base body 2. As a result, the metal fused layer 4 is tightly bonded to the base body 2. Therefore, high bonding results between the layer 4 and the base body 2.

Further, in the present invention, the material of the base body is not deeply advanced into the metal mixture layer 4, and in the layer 4, the molten alloy is diluted with the material of the base body at a relatively small rate. That is, the material of the base body is contained by about 5 to 15% of the total materials of the layer 4. This is due to the fact that alloy powders are used in the present invention to provide the sliding layer 3.

More specifically, relatively low arcing output is required for obtaining a unit amount of molten alloy, since solid alloy mass is not used but alloy powders are used for forming the sliding layer 3. Even by the low arcing output, the powdered alloy can be melted and accumulated onto the end face of the base body 2. Therefore, the material from the base body 2 does not largely occupy the metal mixture layer 4.

Further, because of the low rate dilution, the thickness of the resultant overlaid welding layer 3 can be small. That is, the optimum mixing ratio of the alloy material and the base body material is predetermined such as from 5 to 15%. The metal alloy powders are predominant in order to determine the mixing ratio, since the amount of the material from the base body 2 is relatively small in the layer 4. Therefore, it is unnecessary to supply large amount of alloy powders. (If a large amount of material of the base body is entered into the alloy layer, it is necessary to supply a large amount of the alloy powders to obtain the predetermined mixing ratio, to thereby render the overlaid layer 3 thick.)

Figure 1:
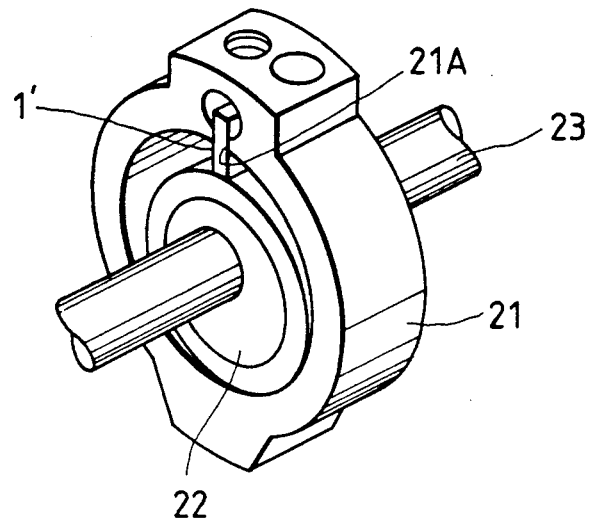
FIG. 1 is a perspective view showing a conventional rotary fluid pump.

Over the metal mixture layer 4, the pure alloy layer 5 is formed, since the material from the base body 2 cannot reach the layer 5. Accordingly, inherent characteristics of the alloy powders can be exhibitted. That is, resultant layer 5 provides high wear resistance, high thermal seizure resistance, and high corrosion resistance. The pure alloy layer 5 is a completely solid structure without any voids. Therefore, the layer 5 does not release metal particles, and as a result, no abrasive wearing occurs during operation. Incidentally, after welding, the resultant vane can be subjected to heat treatment such as carburizing hardening at a portion other than the sliding surface portion, so that the entire surface except the sliding surface can provide wear resistivity. Such resistivity may be required since the vane surfaces are in reciprocal slide contact with the vane groove 21A (FIG. 1).

A vane according to a second embodiment is shown in FIG. 4. In the second embodiment, after forming the overlaid welding layer 3, that is, after formation of the metal fused layer 4 and the pure alloy layer 5, nitriding treatment is effected to the layer 3. For this treatment, soft nitriding, salt bath nitriding, ion nitriding method are available. Further, if the nitriding treatment is conducted, the alloy powders should preferrably be the ferrous alloy. By this nitriding treatment, nitrides are formed in the overlaid welding layer 3, i.e, in the outer layer 5, to thereby further increase wear resistivity and resistance to thermal seizure in comparison with the case where no nitriding treatment is effected to the overlaid welding layer 3. Further, deep formation of the nitrides in the layer 3 is not required in the FIG. 4 embodiment in comparison with the case where nitriding treatment is directly effected over the base body 3 (no overlaid welding layer is provided) yet providing sufficient wear resistivity, thermal seizuire resistance and high hardness of the sliding surface.

In order to demonstrate superiority of the vane according to the present invention, comparative tests were conducted.

SAMPLE 1

A sample 1 is in accordance with the present invention. A base vane body 2 was formed of a carbon steel, S45C defined by JIS containing 0.42–0.48% of C, 0.15–0.35% of Si, 0.6–0.9% of Mn, not more than 0.030% of P, not more than 0.035% of S, and balance Fe. Alloy powders having particle diameter of 90 micron meters were prepared. The powders were formed of Fe—Cr system alloy containing 13% of Cr and balance Fe. Welding was performed by using a plasma powder welding apparatus 10 in which the alloy powders were supplied onto the upper end face of the vane base body to provide an overlaid welding layer. Then, carburizing was effected to the entire surface other than the sliding surface of the resultant vane.

SAMPLE 2

The base vane body 2 was identical with the Sample 1. However, in order to produce a sliding portion, a molybdenum was sprayed onto the end face of the base body.

TEST 1

A rotary type wear testing machine was used for investigation of wear amounts of the Samples 1 and 2. A disc like rotary piece having hardness HRC50 was prepared. The disc was formed of cast iron containing 3.2% of C, 2.2% of Si, 0.8% of Mn, 0.3% of Ni, 0.8% of Cr, 0.3% of Mo, and balance Fe. Each of the Samples was used as a stationary piece and was in pressure contact with an outer peripheral surface of the rotary disc. A lubrication oil was continuously applied through a nozzle to one portion of the rotating disc. The testing condition was as follows:
Lubrication oil supply amount 0.5 liters/min.
Lubricant: freezing machine oil (equivalent to ISO 56)
Load: 40 Kg
Peripheral velocity: 1 m/sec.
Sliding distance: 20 km.

Figure 6:
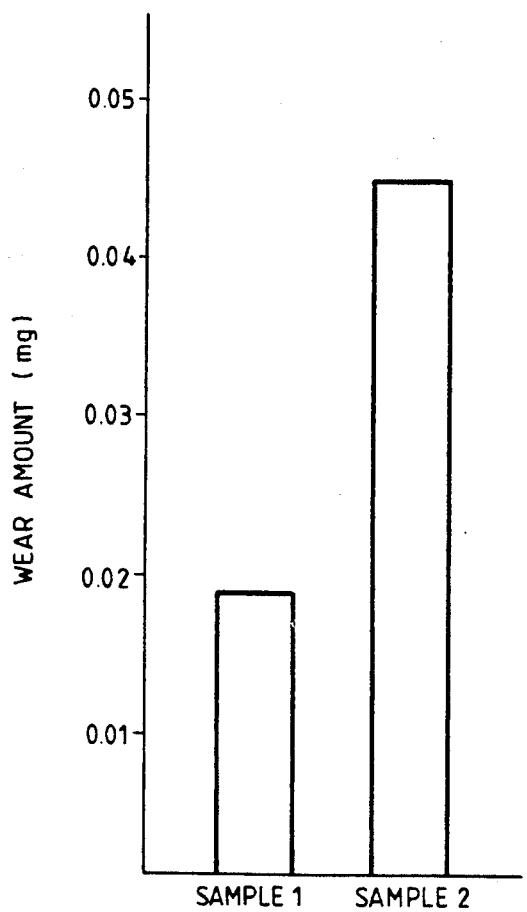
FIG. 6 is a graphical representation showing results of wear amounts in comparative experiments; and, FIG. 7 is a graphical representation showing results of maximum limit pressure to scuffing in another comparative experiments.

Under the above conditions, the amount of wearing of the fixed Samples were measured, the result being shown in a graph of FIG. 6. As is apparent from the graph, the wear amount of the Sample 1 was about half the Sample 2. Therefore, superiority according to the vane of this invention is acknowledgeable in terms of wear resistivity.

TEST 2

Prepared were the Samples 1 and 2 as described above. and wear testing machine was also identical with that used in the Test 1. The rotary disc which was identical with the disc in Test 1 was rotated by a predetermined period. If no scuffing was acknowledged, the contacting pressure of the stationary piece with respect to the rotary disc was gradually elevated, so that maximum limit pressure to scuffing was tested. The testing conditions were as follows.
Lubrication oil amount; 150 cc in an oil pan (a part of the rotary disc was always dipped into the oil)
Lubricant: freezing machine oil (equivalent to ISO 56)
Oil temperature: 30° C.
Peripheral velocity: 3 m/sec.

The load of 10 kg was initially applied to the fixed sample, and then, the load was added by 10 kg at every 2 minutes until thermal seizure occurred. The load at which the thermal seizure occurred were regarded as the maximum limit pressure to scuffing.

Figure 7:
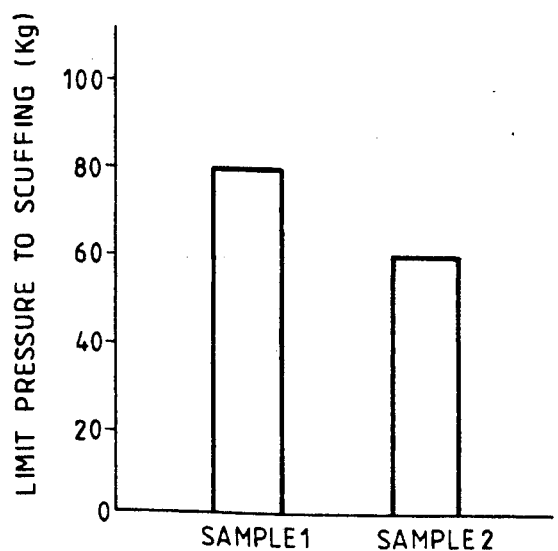

According to a test result shown in FIG. 7, in the Sample 1, scuffing occurred at the load of 80 kg, whereas in the Sample 2, the scuffing occurred at the load of 60 Kg. Therefore, it is understood that the vane according to the present invention also provides excellent scuffing resistance.

In view of the foregoing, according to the vane of this invention, high bonding strength is obtainable between the vane base body and the overlaid welding layer, since the alloy powders were meltingly deposited onto the end face of the base body by using plasma powder welding method. With this method, the overlaid layer includes the inner metal fused layer in which the material of the alloy powders are fused with the material of the base body, and the outer alloy layer formed of pure powder alloy having high wear resistance, high thermal seizure resistance and high corrosion resistance. The overlaid welding layer does not contain voids. Therefore, the alloy powders are fuse bonded together which prevents a free metal particles from being released from the layer. Therefore, further improvement is obtainable in terms of abrasive wearing.

Further, in the present invention, the outer layer is formed of pure alloy powder materials. Therefore, inherent characteristics attendant to the initially prepared alloy powders can be exhibitted, that is, the sliding surface has high wear resistivity, high thermal seizure resistance, high corrosion resistance and high thermal resistance.

Furthermore, in the present invention, the alloy powders are not provisionally accumulated on the end face of the base body for subsequent heating to the powders, but are supplied concurrent with the application of the plasma arc. Therefore, disadvantageous powder scattering is avoidable, to thereby enhance material yieldability.

Moreover, the alloy layer is only required at the sliding surface portion of the vane, and remaining part thereof can be formed of inexpensive material such as cast iron and steel. Therefore, the vane of this invention can be produced at low cost.

While the invention has been described in detail and with reference to specific embodiment thereof, it would be apparent for those skilled in the art that various changes and modifications can be made therein without departing from the spirit and scope of the invention.

What is claimed is:

1. A vane for a rotary fluid pump said vane including a roller and a roller housing, comprising:
   a base vane body (2) formed of a ferrous material and having one end face; and,
   a sliding layer integrally formed over the end face and in sliding contact with the roller, the sliding layer comprising an overlaid welding layer (3) formed of fused alloy powders having high wear resistance, thermal seizure resistance and corrosion resistance, and the overlaid welding layer being formed by electrical plasma arc powder welding and comprising an intermediate metal fused layer (4) integrally formed over the end face and an outer pure alloy layer (5) formed over the metal fused layer, the metal fused layer containing from 5 to 15% of the ferrous material of the base vane body and the remainder comprising the alloy powder material, and the pure alloy layer only containing the alloy powder material.

2. The vane as defined in claim 1, wherein the alloy powders is formed of materials selected from the group consisting of composite carbide alloy, cobalt-base alloy and ferrous alloy.

3. A vane as defined in claim 1, wherein the pure alloy layer contains nitrides.

* * * * *